Patented Oct. 9, 1945

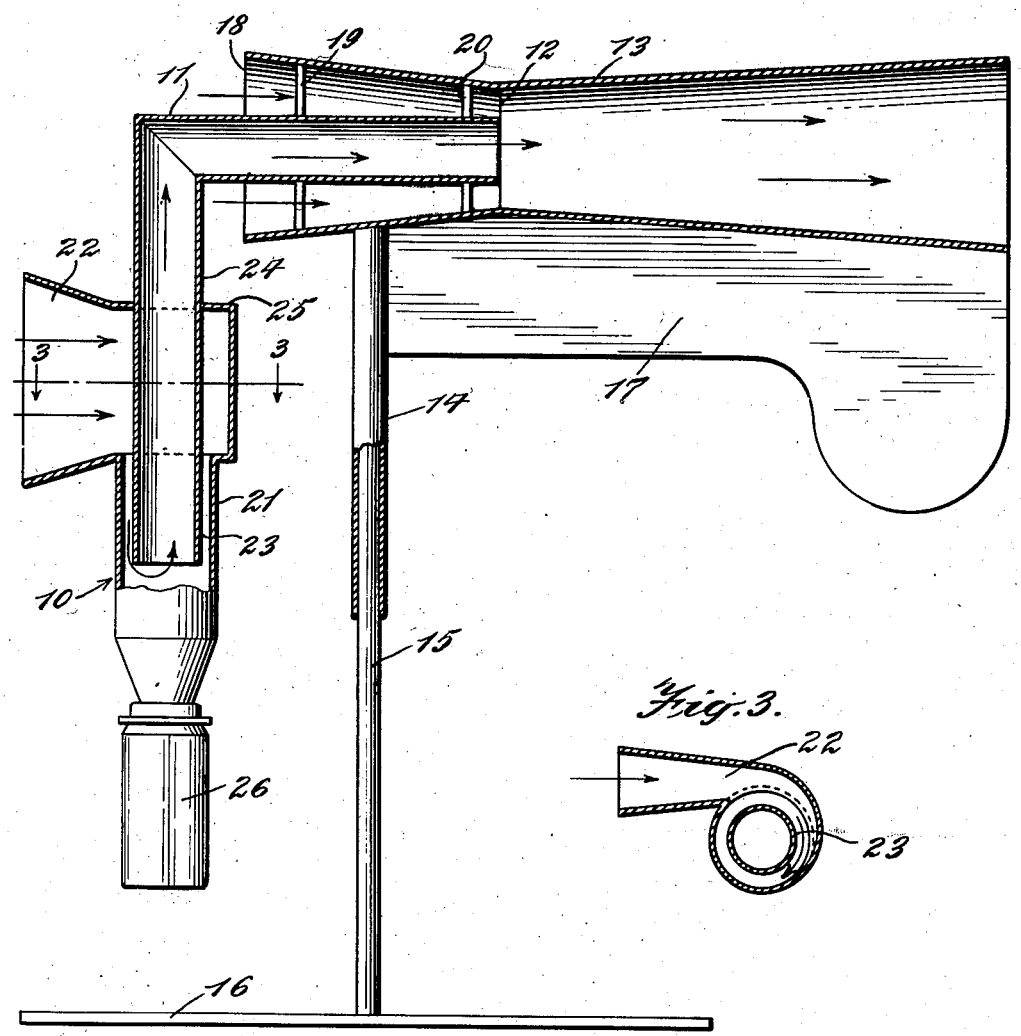

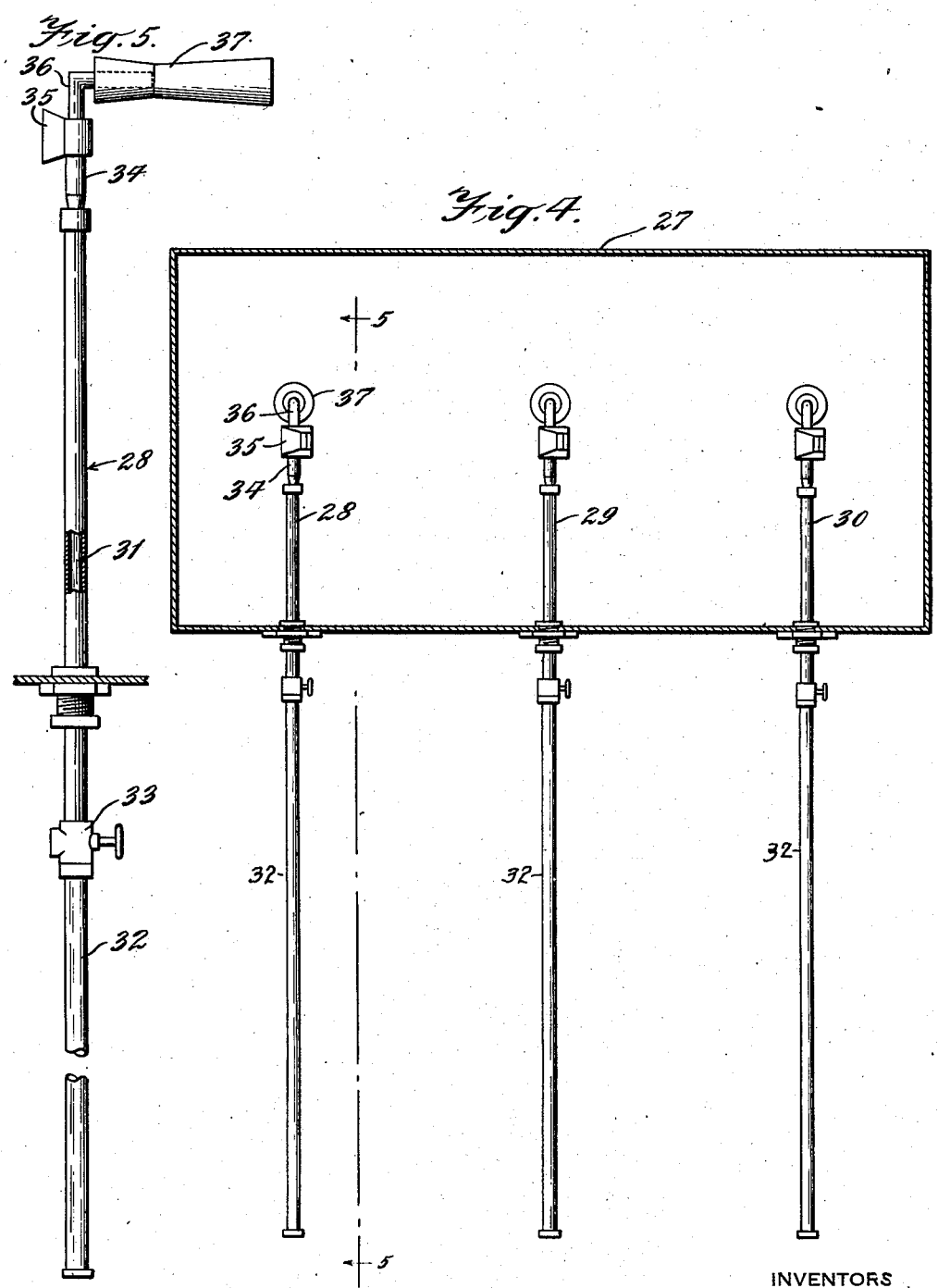

2,386,282

UNITED STATES PATENT OFFICE 2,386,282

DUST SAMPLER

John E. Watson, Westport, Conn., and Charles B. McBride, Port Chester, N. Y., assignors to Prat-Daniel Corporation, East Port Chester, Conn., a corporation of New York Application April 22, 1944, Serial No. 532,364

5 Claims. (Cl. 73—422)

Our invention relates to a dust sampling device whereby the dust in a stream of gas or air, such as that of the atmosphere or certain industrial gases, may be collected and measured quantitatively and qualitatively.

In our invention a small part or sample of the air or industrial gas is drawn through a dust separating apparatus of any suitable type whereby the dust or suspended particles in the air or gas is removed and collected in a receptacle for sampling while the air or gas is returned to the stream or volume from which it was withdrawn.

The apparatus for separating the dust may be of any one or more of the dust separating and collecting apparatus, such as a filter of electric or centrifugal type, but preferably of a centrifugal type in which the suspended particles are projected out of the air stream and may then drop directly into a collecting receiver in which the amount may be measured or observed at selected time intervals and from it may be removed for qualitative analysis.

Any suitable means may be employed for drawing a part or sample of the air through the dust separating or collecting apparatus and then returning it to the main volume or stream of air. Where the air or gas is in motion a venturi may be employed for creating a current or stream of air through the dust collecting apparatus with the outlet of the collecting apparatus positioned in the throat of the venturi and inlet opening in the direction from which the air or gas flows. When the Venturi means is employed in the atmosphere in which the direction of flow of the air changes or varies, the venturi may be mounted on a vertical pivot and be provided with a weather vane which will maintain the open end of the venturi and the intake to the dust sampling apparatus heading into the wind.

In sampling an industrial gas, such as the flue gas from a boiler, smelter, etc., in which the direction of flow of the gases does not vary substantially, the venturi may be fixed in position.

The various features of the invention are illustrated, by way of example, in the accompanying drawings in which:

Fig. 1 is an elevation partly in section of a preferred form of the invention employing a centrifugal separator for use in the atmosphere or in a stream of gas in which the direction of flow may vary;

Fig. 2 is a plan view on a smaller scale of the apparatus shown in Fig. 1;

Fig. 3 is a horizontal section taken on the line 3—3 of Fig. 1;

Fig. 4 is an elevation taken through a section of a flue embodying a modification of the invention adapted for sampling the gases of a flue;

Fig. 5 is an elevation on a larger scale of the sampling apparatus of Fig. 4 taken on the line 5—5 of Fig. 4.

Referring more particularly to Figs. 1, 2 and 3, a centrifugal sampling collector 10 is shown with an outlet or exhaust pipe 11 opening or emptying into the throat 12 of a Venturi tube 13. The Venturi tube 13 is provided with a downwardly extending hollow shaft 14 which is rotatably supported on an upright spindle 15 supported on a suitable base 16.

A vane 17 depends from the Venturi tube 13 and may also be connected at its front or leading edge to the hollow spindle 14 so that it is rigidly secured to the venturi. It will thus be understood that the vane 17 will maintain the Venturi tube in alignment with the direction of flow of the air stream and with its open or intake end 18 heading into the wind. The outlet tube 11 of the dust collecting apparatus may be supported in the Venturi tube by suitable spiders 19 and 20. Ot being understood that the velocity being greater in the throat 12 the pressure head will be less at this point than it is in the main air current thus creating a suction which will draw air continuously through the centrifugal collecting apparatus 10 into throat 12 from whence it will return and commingle with the air stream.

The centrifugal collecting apparatus preferably comprises a centrifugal tube 21 of small diameter as, for example, from one to two inches and having a tangential inlet 22 the form of which is shown in Figs. 2 and 3. This inlet is preferably pointed toward the windward to obtain the maximum velocity through the centrifugal apparatus.

Air or gases entering the inlet 22 move circularly and downwardly around an annular space 23 formed between the centrifugal tube 21 and a down-take extension 24 of the outlet tube 11. The down-take tube 24 extends somewhat below the level of the tangential inlet 22 and the upper end of the tube 21 is closed by a top plate 25 which seals about the down-take tube 24. The air entering the tangential inlet 22 is thus caused to move helically downwardly and at a very rapid velocity until it reaches the lower end of the tube 24. At this point the rotation of the air or gas throws the particles against the inner surface of the tube 10 from whence they continue to drop downwardly into a collecting receptacle 26 secured to the lower end of the tube 21 while the air or gases enter a relatively quiescent zone immediately below the tube 24 and then flow upwardly into the outlet 11 and into the venturi 13.

Owing to the small diameter of the centrifugal tube and the velocity obtained by means of the Venturi tube 13, the air or gas moves with a high angular velocity through the annular space 23 so that even the finest particles of dust or other suspended material are thrown out of the air stream.

The amount of material thus collected may be readily observed from time to time in the receptacle 26 which for this purpose may be made of glass or other transparent material. The composition of the suspended particles may also be taken from the receptacle 26 and examined for particle size as well as chemical composition.

In the modification shown in Figs. 4 and 5 one or more of the sampling devices are installed in a flue 27 through which industrial gases may flow as, for example, in the flue of a boiler, a metallurgical furnace, flour mill or other industrial plant.

In the specific example shown in Fig. 4, three such sampling devices 28, 29 and 30 are illustrated, by way of example, positioned at spaced intervals in the transverse area of the flue, but it will be understood that any desired number may be employed as conditions may require.

In each of the sampling devices 28, 29 and 30 (28 being taken for illustration), a collecting tube 31 extends vertically into the flue, the lower end of the tube 31 terminating in a collecting column 32 which may be made of glass or other transparent material. A valve 33 may be provided to close the tube 32 from the tube 31 when desired as, for example, for removing a sample.

At the upper end of the collecting tube 31 is provided a centrifugal tube 34 similar to the centrifugal tube 21 of Fig. 1 and having a tangential inlet 35 and an off-take pipe 36 leading into and opening into the throat of venturi 37. The construction of the centrifugal tube, tangential inlet, outlet tube and venturi, are substantially the same as or similar to those shown in Fig. 1 and are not illustrated in detail.

It will be understood that the collecting tube 31 supports the centrifugal tube 34 so that its tangential inlet will point toward the source of flow as will also the inlet of the Venturi tube 37.

With a constant flow of gases through the flue a constant and measurable stress of gas will be drawn into the tangential inlet and thence through the centrifugal separating tube 34. From this the amount of gases flowing through the apparatus may be calculated for a given period of time and also the amount of dust which has collected in the collecting tube 32 may be measured and analyzed thus giving a sample of the amount of suspended material in the flue gases. After a sample has collected it may be withdrawn for chemical or other analysis. Inasmuch as the separation of the suspended material from the sample stream is substantially complete a representative sample of the suspended material is thus obtained as well as an accurate measurement of its concentration in the gas.

While the centrifugal type of separator has been illustrated by way of example, it will be understood that the invention is not restricted to the specific type shown and that other types of separators giving a substantially complete separation may be employed.

What we claim is:

1. A dust sampling apparatus which comprises a Venturi tube, means to support said Venturi tube to pivot on a vertical axis, an upright vane secured to said Venturi tube back of said pivotal support, a dust collector supported from said Venturi tube and having an outlet opening into the throat of said Venturi tube and an inlet directed in the same direction as the inlet of said Venturi tube and a dust storage space or receptacle to receive separated particles from said dust collector.

2. A dust sampling apparatus which comprises a flue, an upright tube extending into said flue, a dust separator supported on said tube in position to discharge separated dust thereinto and having an inlet opening directed to the source of flow of gases through said flue and having an outlet pipe and a venturi mounted on said outlet pipe to head in the same direction as the inlet to said dust collector and with the discharge end of said outlet pipe in the throat of said venturi.

3. A dust sampling apparatus which comprises a Venturi tube, a centrifugal dust separator comprising a centrifugal tube having a tangential inlet, a collector at the lower end of said tube and an open ended outlet tube extending into said centrifugal tube past the inlet end thereof to form an annular centrifugal passage and opening into the throat of said venturi.

4. A dust sampling apparatus which comprises a flue, a centrifugal dust separator in said flue comprising a centrifugal tube having a tangential inlet directed toward the source of flow of gas in said flue, a collector at the lower end of said centrifugal tube and supporting said centrifugal tube in said flue, an outlet pipe extending downwardly into said centrifugal tube past said tangential inlet and a Venturi tube opening toward the source of flow of gas in said flue, said outlet pipe opening into the throat of said venturi.

5. A dust sampling apparatus which comprises a Venturi tube, means to support said Venturi tube to pivot on a vertical axis, an upright vane secured to said Venturi tube back of said pivotal support, a dust collector supported from said Venturi tube and comprising a centrifugal tube having a tangential inlet, an outlet pipe extending downwardly into said centrifugal tube past said tangential inlet and opening into the throat of said venturi and a dust receiving receptacle to receive separated particles from said centrifugal tube.

JOHN E. WATSON.
CHARLES B. McBRIDE.